United States Patent
Harada

(10) Patent No.: US 7,036,617 B2
(45) Date of Patent: May 2, 2006

(54) RADIATOR FASTENER

(75) Inventor: Akinori Harada, Fujisawa (JP)

(73) Assignees: NIFCO Inc., Yokohama (JP); Calsonic Kansei Corporation, Tokyo (JP)

( * ) Notice: Subject to any disclaimer, the term of this patent is extended or adjusted under 35 U.S.C. 154(b) by 158 days.

(21) Appl. No.: 10/341,354

(22) Filed: Jan. 14, 2003

(65) Prior Publication Data
US 2003/0146030 A1  Aug. 7, 2003

(30) Foreign Application Priority Data
Feb. 1, 2002  (JP) .................................... 2002-025271

(51) Int. Cl.
*B60K 11/04*     (2006.01)

(52) U.S. Cl. ...................................... 180/68.4; 248/232
(58) Field of Classification Search ................ 180/68.4, 180/300, 312; 165/69, 67, 149; 248/213.3, 248/233, 213.4, 635, 232; 292/251, DIG. 16
See application file for complete search history.

(56) References Cited

U.S. PATENT DOCUMENTS

| | | | | |
|---|---|---|---|---|
| 3,929,201 A | * | 12/1975 | Hoffman | 180/68.4 |
| 5,544,714 A | * | 8/1996 | May et al. | 180/68.4 |
| 5,996,684 A | * | 12/1999 | Clifton et al. | 165/67 |
| 6,318,450 B1 | * | 11/2001 | Acre | 165/67 |
| 6,412,581 B1 | * | 7/2002 | Enomoto et al. | 180/68.4 |
| 6,668,956 B1 | * | 12/2003 | Pelage et al. | 180/68.4 |

* cited by examiner

*Primary Examiner*—Hau Phan
(74) *Attorney, Agent, or Firm*—Manabu Kanesaka

(57) ABSTRACT

A radiator fastener which tightens a radiator to a car body includes a first engagement member having a fit protrusion piece and fixed to the car body, and a second engagement member with a fit depressed portion, which is free to be fitted to and removed from the fit protrusion piece of the first engagement member. The second engagement member is engaged with a part of the radiator through an elastic member, and is fixed to the first engagement member. The radiator fastener can be tightened through one-touch operation and this improves workability significantly.

5 Claims, 4 Drawing Sheets

RADIATOR FASTENER

BACKGROUND OF THE INVENTION AND RELATED ART STATEMENT

The present invention relates to a radiator fastener to be able to fix a radiator in an automobile and other car bodies.

FIG. 8 is an explanatory drawing showing an example of the conventional radiator fastener. Here, the radiator fastener is composed of a metal bracket 3 which is engaged with a radiator 2 through a gum bush 1, bolt and nut 4, etc. After the radiator 2 is mounted on stays 5 which project from the side of a car body 6, the radiator fasteners are tightened with the bolts and nuts 4 while the metal brackets 3 fixed on the side of the radiator 2 are adjusted to a position to the side of the car body 6.

However, the above-mentioned conventional radiator fastener has many parts, so that it results in high manufacturing cost, and at the same time it takes time to operation. Additionally, it requires tools for tightening the bolt and nut.

The present invention has been made in view of the above-mentioned circumstances, and an object of the invention is to provide a radiator fastener which is excellent for stability and building workability.

Further objects and advantages of the invention will be apparent from the following description of the invention.

SUMMARY OF THE INVENTION

In order to achieve the above-mentioned purposes, in the first aspect of the invention, a radiator fastener tightens a radiator to a car body. This radiator fastener includes a first engagement member having a fit protrusion piece and fixed to the car body, and a second engagement member having a fit depressed portion freely engaging with and disengaging from the fit protrusion piece of the first engagement member. In the radiator fastener, the radiator is fastened to the car body by fitting the first engagement member while a part of the radiator is engaged to the second engagement member through an elastic member.

In addition, in the second aspect of the invention, the second engagement member is almost U-shaped, and by holding the elastic member in this U-shaped depressed portion, the radiator is tightened to the car body through this elastic member.

Also, in the third aspect of the invention, the first engagement member includes the fit protrusion piece which can be fitted in the second engagement member at right and left sides, an arc-like depressed portion between these two fit protrusion pieces. A part of the elastic member is pressed and held in the arc-like depressed portion when this first engagement member fits in the second engagement member.

Additionally, in the fourth aspect of the invention, in the second engagement member, the engagement pieces which engage the fit protrusion pieces of the first engagement member are disposed to face the fit depressed portions.

Moreover, in the fifth aspect of the invention, the elastic member has an almost disc shape, and contacts the U-shaped depressed portion and the arc-like depressed portion in the periphery of this circular disc. The elastic member is tightened to a part of the radiator through a fixing hole formed in the center thereof.

DETAILED DESCRIPTION OF PREFERRED EMBODIMENTS

Figure 1:
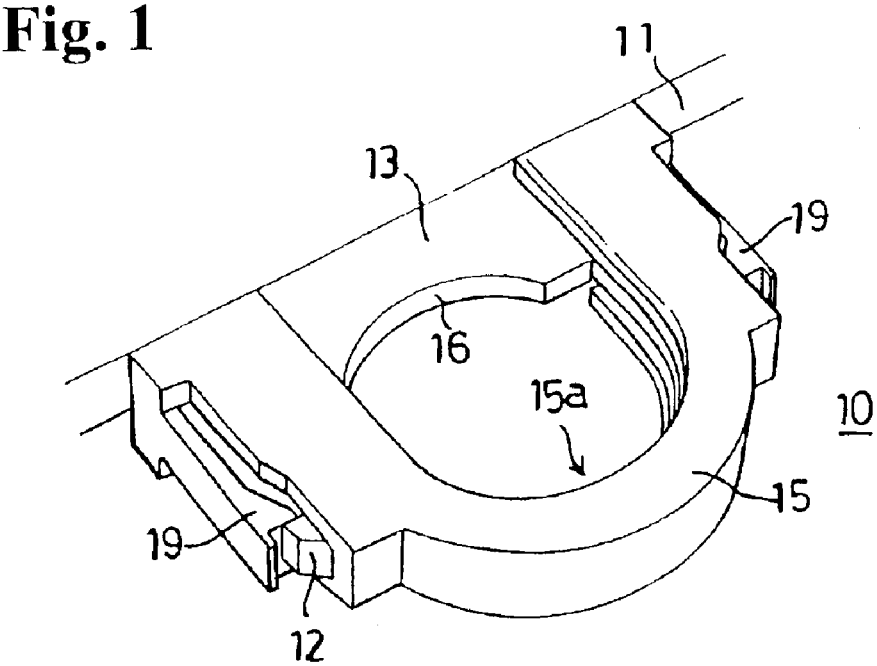
FIG. 1 is a perspective view showing an example of a radiator fastener according to the present invention.
Figure 2:
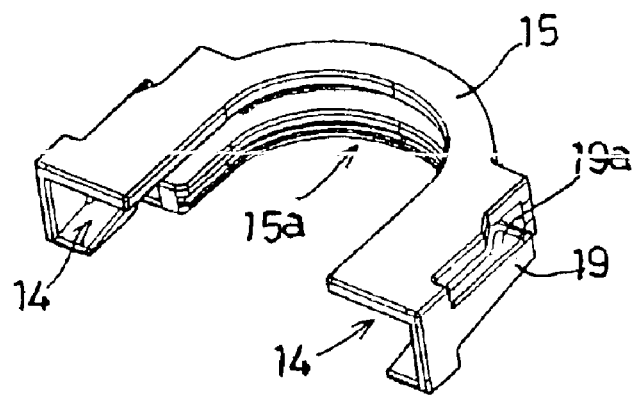
FIG. 2 is a perspective view showing the second engagement member of the radiator fastener.
Figure 3:
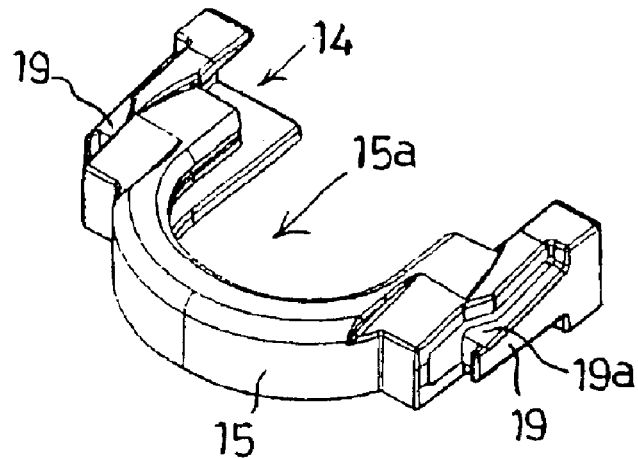
FIG. 3 is a perspective view showing the second engagement member upside down.
Figure 4:
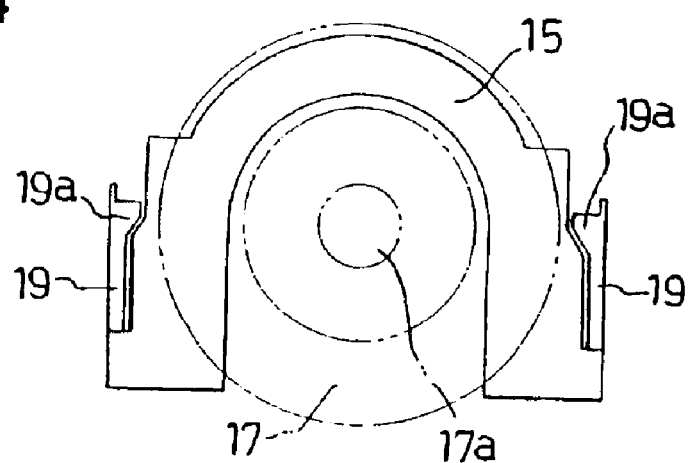
FIG. 4 is a plan view of the second engagement member.
Figure 5:
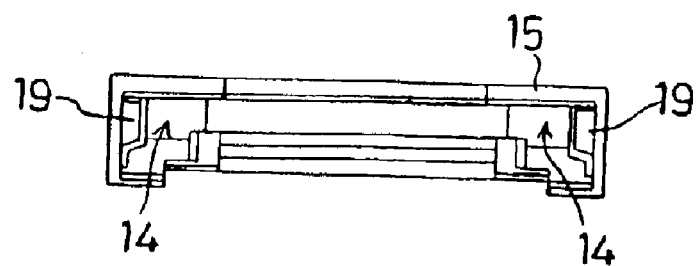
FIG. 5 is a rear view of the second engagement member.

Hereunder, details of this invention are explained according to the attached drawings of the embodiments. Here, FIG. 1 is a perspective view showing an example of a radiator fastener according to the present invention; FIG. 2 is a perspective view showing the second engagement member of the radiator fastener; and FIG. 3 is a perspective view showing the second engagement member upside down.

Figure 6:
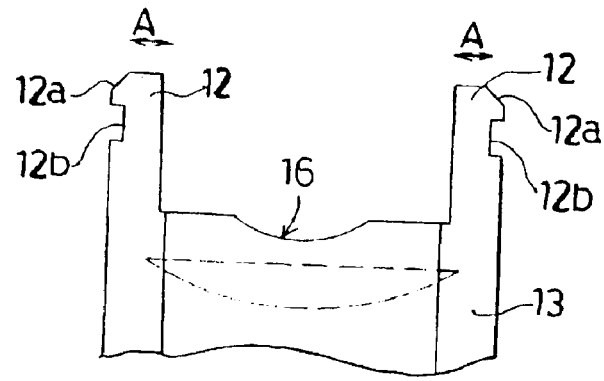
FIG. 6 is a plan view showing the first engagement member used on the radiator fastener of this invention.

The radiator fastener 10 includes the first engagement member 13 which is fixed to the side of the car body 11 and also includes fit protrusion pieces 12, and the second engagement member 15 which provides fit depressed portions 14. This fit depressed portion 14 is free to be fitted and removed to the fit protrusion piece 12 of the first engagement member 13. The first engagement member 13 includes fit protrusion pieces 12 which can fit in the second engagement member 15 at right and left sides as shown in FIG. 6, and also an arc-like depressed portion 16 in the middle of these fit protrusion pieces 12. When the second engagement member 15 is fitted, a part of the attached elastic member is pressed to hold in the arc-like depressed portion 16.

The fit protrusion piece 12 includes a taper portion 12a near the edge, and an engagement depressed portion 12b which opens toward the periphery. Additionally, the fit protrusion piece 12 has a reasonable flexibility and can deflect to the directions of the arrow A.

The almost U-shaped second engagement member 15 holds an elastic member 17 in a U-shaped depressed portion 15a, and tightens the radiator 18 to a car body 11 through this elastic member 17. Additionally, the second engagement member 15 includes the engagement piece 19 to face the fit depressed portion 14, which engages the fit protrusion piece 12 of the first engagement member 13. Moreover, the engagement piece 19 includes the protrusion portion 19a which can fit in the engagement depressed portion 12b of the fit protrusion piece 12 attached to the first engagement member 13 in the edge portion.

Additionally, the elastic member 17 has almost a disc shape formed from synthetic rubber and so on, and contacts the U-shaped depressed portion 15a and the arc-like depressed portion 16 at the periphery of this circular disc. The elastic member 17 is held by a bolt 20 which is attached to the upper edge of the radiator 18 and passes through a fixing hole 17a formed in the center thereof. Therefore, the elastic member 17 can act as a rubber vibration isolator to block the vibration.

Figure 7:
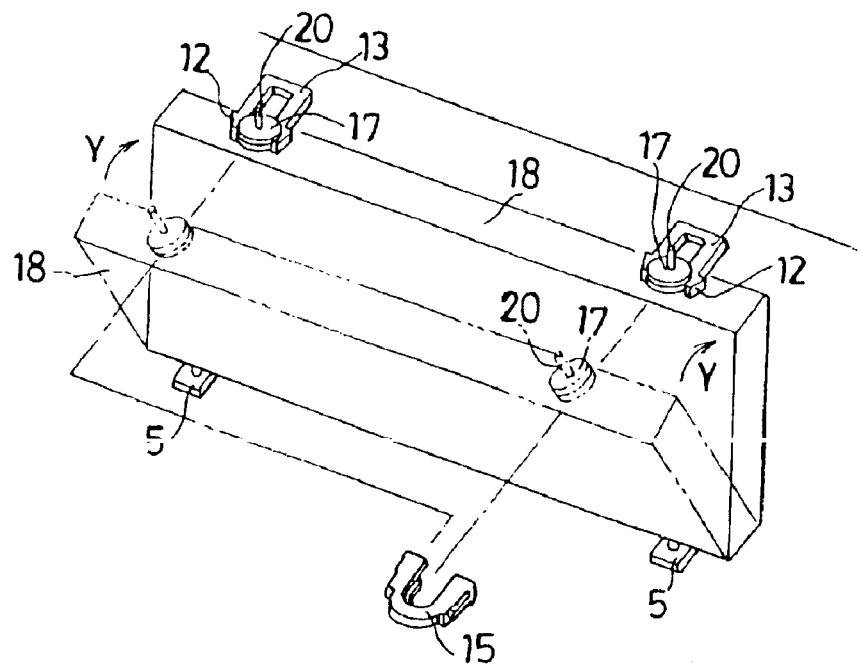
FIG. 7 is an explanatory drawing showing the radiator fastener during use.
Figure 8:
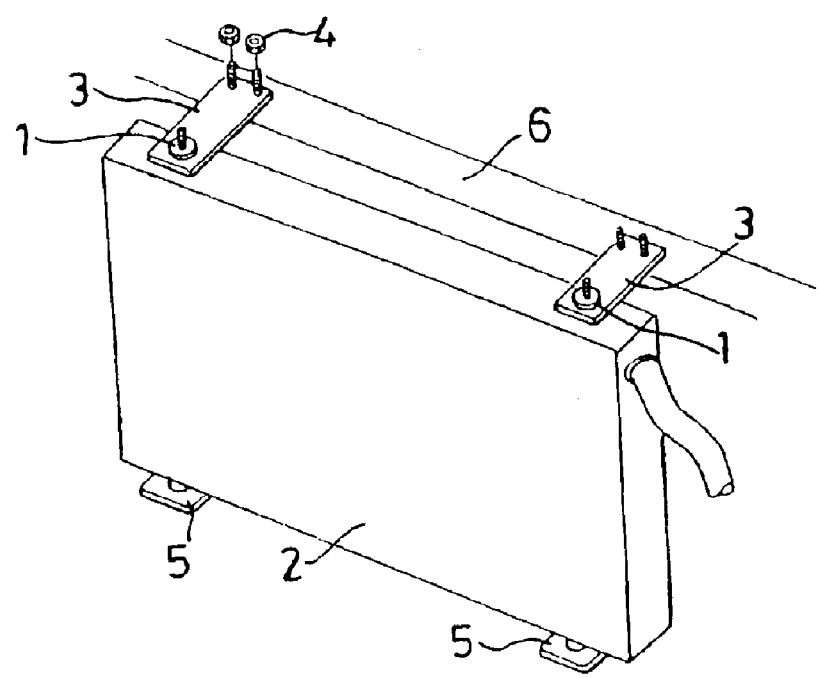
FIG. 8 is a perspective view showing an example of the conventional radiator fastener.

Next, the usage of the above-mentioned radiator fastener 10 is explained. First, the elastic member 17 is attached on the bolt 20 which is built on the upper edge of the radiator 18 as shown in FIG. 7. In this embodiment, two bolts 20 are attached on the upper edge side of the radiator 18, and each elastic member 17 is attached to each bolt 20. The lower edge of the radiator 18 is placed on the stays 5 projecting from the car body 11, and in this state, the position between the first engagement member 13 fixed on the car body 11 and the bolt 20 is adjusted.

After the adjustment of the position is confirmed, the upper edge of the radiator 18 is rotated to the direction of Y arrow and the second engagement member 15 is fitted to the first engagement member 13 while the elastic member 17 attached to the bolt 20 is sandwiched. The second engagement member 15 can be fitted in the first engagement member 13 only by pushing, and no tool is required. Therefore, it can be attached in an extremely short time.

Additionally, when the radiator 18 is removed, the second engagement member 15 can be easily removed from the first engagement member 13 by pulling out the engagement pieces 19 outward. When it is removed, no tool is required and it can be done by hand.

Moreover, the engagement member in the current invention can be manufactured optimally using metal, synthetic resin, and engineer plastic which are excellent for burning resistance, mechanical strength, and fatigue resistance, such as polyacetal, etc.

The invention comprises the above-mentioned structure, so that it can obtain the following advantages.

In the first aspect of the invention, the radiator fastener is tightened to the radiator on the car body. This radiator fastener provides the first engagement member fixed to the side of the car body and having the fit protrusion piece, and the second engagement member having the fit depressed portion which is free to be fit and removed in the fit protrusion piece of the first engagement member. The radiator fastener tightens the radiator to the car body by fitting the first engagement member while engaging a part of the radiator through the elastic member to the second engagement member.

Because of these structures, the radiator can easily be fastened to the car body by only fitting the second engagement member to the first engagement member. Additionally, no tool is required during operation, and operating efficiency can be significantly improved. Moreover, the number of parts can be reduced and this results in reduced manufacturing costs.

Also, in the second aspect of the invention, the second engagement member is almost U-shaped and also holds the elastic member in this U-shaped depressed portion. Because the radiator is tightened to the car body through this elastic member, the radiator can be stably fastened to insulate vibration from the car body.

Additionally, in the third aspect of the invention, the first engagement member includes the fit protrusion pieces fitting in the second engagement member at the right and left sides, and the arc-like depressed portion between these two fit protrusion pieces. When the first engagement member fits the second engagement member, a part of the elastic member is pressed to be held in the arc-like depressed portion, and the elastic member is held from the surrounding area, so that the first engagement member can completely block the vibration from the car body.

Also, in fourth aspect of the invention, in the second engagement member, the engagement piece engaging the fit protrusion piece of the first engagement member is disposed to face the fit depressed portion, so that the fit protrusion piece can be engaged with the engagement piece without fail, and the first engagement member can be fitted to the second engagement member precisely.

Additionally, in the fifth aspect of the invention, the elastic member has almost a disc shape, and contacts the U-shaped depressed portion and the arc-like depressed portion at the periphery of this circular disc. Also, the elastic member is tightened to a part of the radiator at the fixing hole formed in the shaft center. Thus, the radiator can be held through the elastic member all the time.

While the invention has been explained with reference to the specific embodiments of the invention, the explanation is illustrative and the invention is limited only by the appended claims.

What is claimed is:

1. A radiator fastener for tightening a radiator to a car body, comprising:

a first engagement member to be fixed to the car body and having at least one fit protrusion piece, a second engagement member having at least one fit depressed portion freely fitted to and removed from the at least one fit protrusion piece, and an elastic member to be attached to the radiator, said first and second engagement members surrounding the elastic member and being fastened together to thereby attach the radiator to the car body.

2. A radiator fastener according to claim 1, wherein said second engagement member has a U-shape and a U-shape depression to hold the elastic member therein.

3. A radiator fastener according to claim 2, wherein said first engagement member includes two fit protrusion pieces at two sides thereof and an arc-shape depressed portion between the two fit protrusion pieces so that when the first engagement member is engaged with the second engagement member, a part of the elastic member is held and compressed in the arc-shape depressed portion.

4. A radiator fastener according to claim 3, wherein said second engagement member includes two fit depressed portions for receiving the two fit protrusion pieces, and engagement pieces facing the fit depressed portions, respectively, said engagement pieces engaging the fit protrusion pieces of the first engagement member.

5. A radiator fastener according to claim 4, wherein said elastic member has a disc shape and a center hole to be connected to the radiator therethrough, said elastic member contacting the U-shaped depressed portion and the arc-shape depressed portion at the periphery of the circular disc.

* * * * *